United States Patent [19]

Piltz et al.

[11] 4,056,221

[45] Nov. 1, 1977

[54] LAMINATED PACKAGE

[75] Inventors: Lars-Erik Piltz, Dalby; Claes Tvingstedt, Malmo, both of Sweden

[73] Assignee: AB Akerlund & Rausing, Lund, Sweden

[21] Appl. No.: 638,367

[22] Filed: Dec. 8, 1975

[30] Foreign Application Priority Data

Dec. 12, 1974 Sweden .................. 7415580

[51] Int. Cl.² .................. B65D 5/40; B65D 5/62
[52] U.S. Cl. .................. 229/14 BL; 229/31 R; 229/3.5 MF
[58] Field of Search ............. 229/14 BL, 14 BW, 30, 229/31 R, 43, 4.5 MF

[56] References Cited

U.S. PATENT DOCUMENTS

| 1,162,524 | 11/1915 | Staley et al. | 229/14 BL |
| 2,407,118 | 9/1946 | Waters | 229/31 X |
| 2,859,905 | 11/1958 | Choate | 229/30 X |
| 3,074,798 | 1/1963 | Palmer | 229/31 R X |
| 3,406,891 | 10/1968 | Buchner et al. | 229/3.5 MF |
| 3,489,331 | 1/1970 | Andersson | 229/31 R X |
| 3,597,302 | 8/1971 | Gerard | 229/14 BL X |
| 3,885,730 | 5/1975 | Christensson | 229/14 BL X |
| 3,934,749 | 1/1976 | Andrulionis | 229/43 X |

Primary Examiner—Davis T. Moorhead
Attorney, Agent, or Firm—Lerner, David, Littenberg & Samuel

[57] ABSTRACT

A blank and a container formed from the blank is disclosed which comprises a first member having a first thickness which includes a bottom field and a plurality of side fields which project upwardly from the bottom field to define a cavity when the blank is formed into a container. The side fields include side edges which define cut-out portions between adjacent side edges. A second member having a second thickness less than the first thickness is provided and arranged in overlying relation to the first member and extends beyond the side edges of the side fields to completely fill the cut-out portions. The portion of the second member that fills the cut-out portions can be folded upon itself to define sealing flap means when the blank is formed into a container, the sealing flap means being operative to seal adjacent side fields together along their side edges.

21 Claims, 12 Drawing Figures

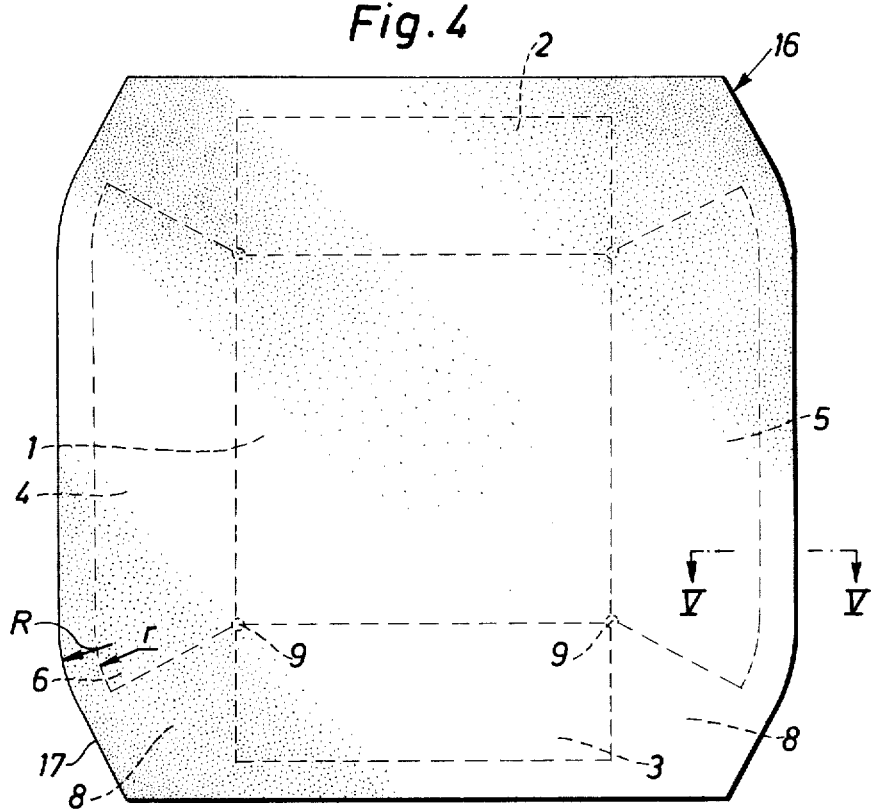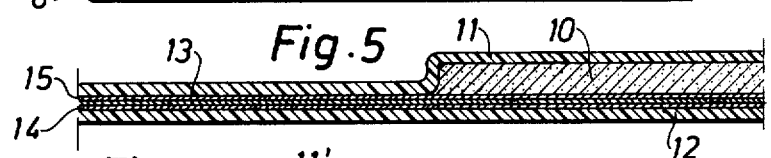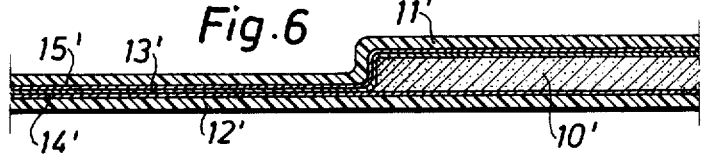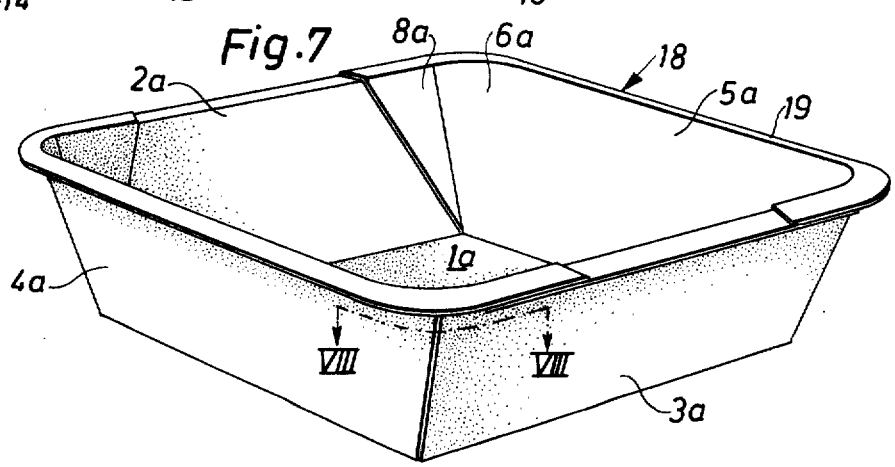

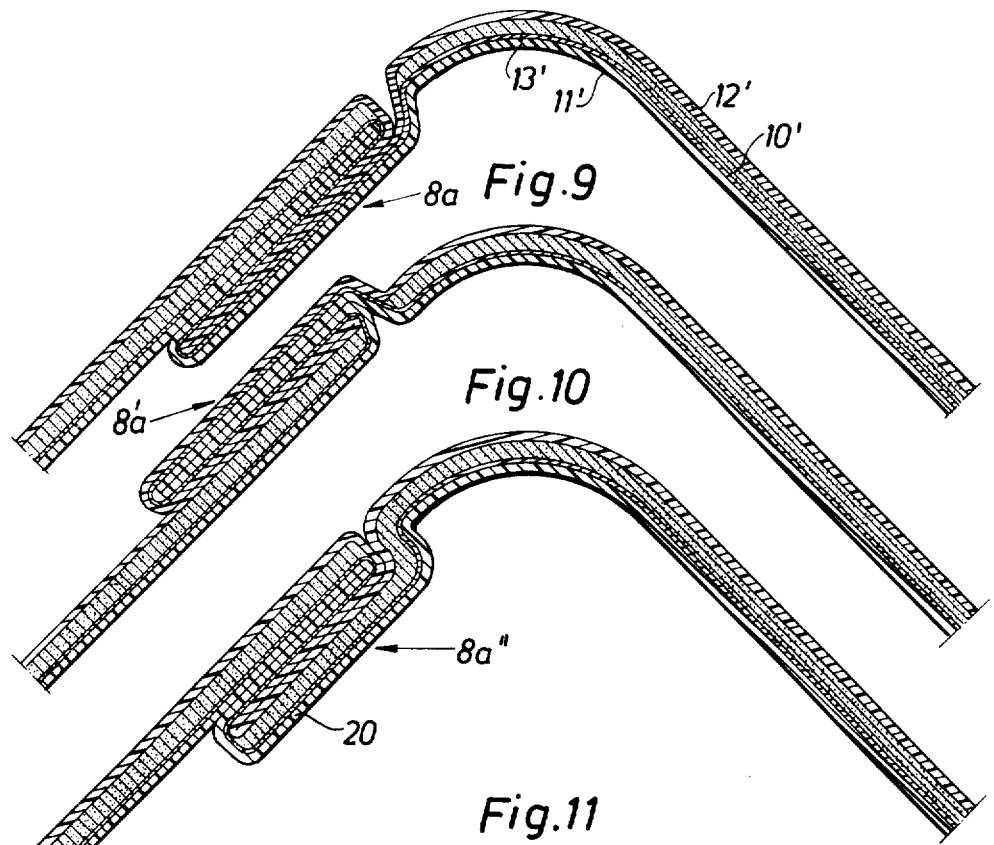
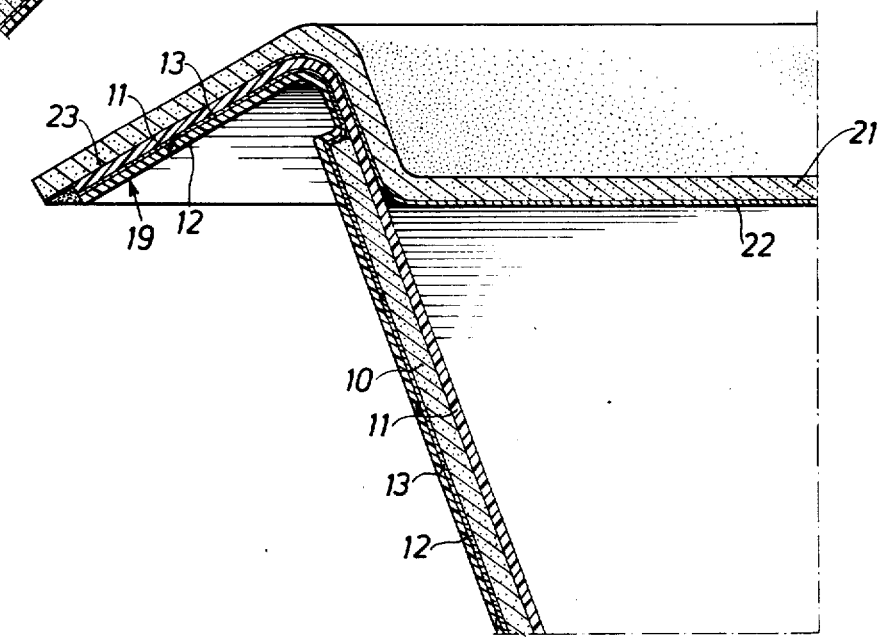

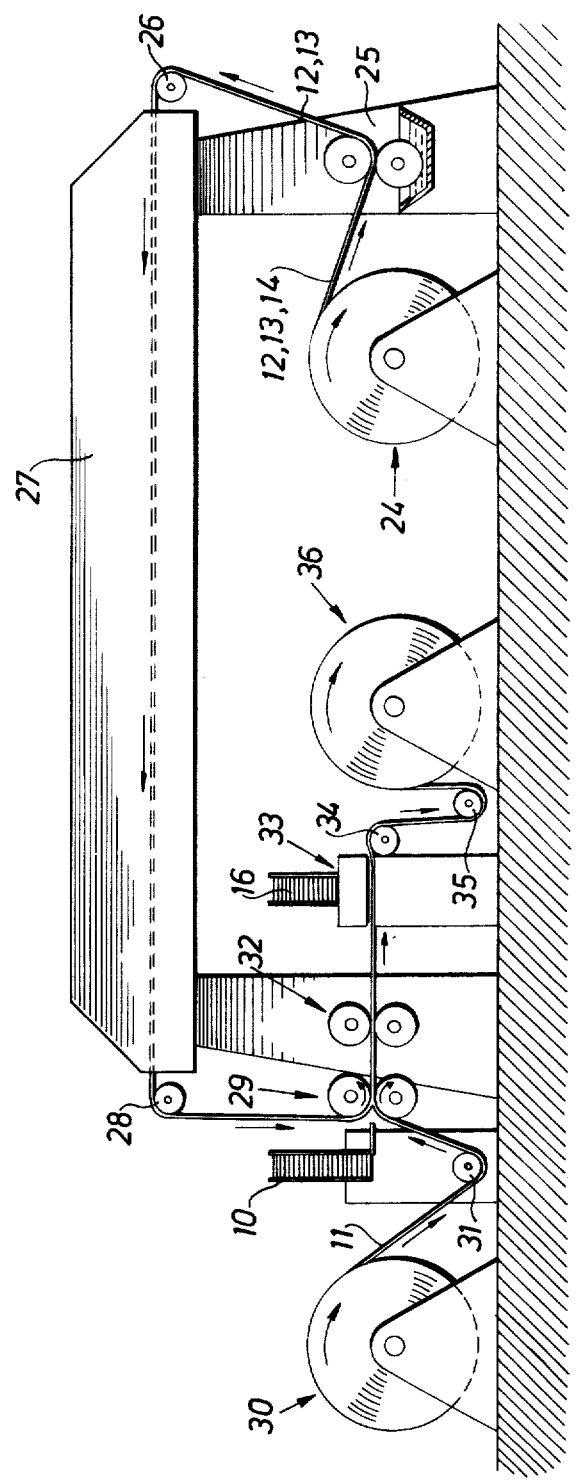

LAMINATED PACKAGE

SUMMARY OF THE INVENTION

The present invention refers to a package involving a bottom field and a number of sides, preferably four, raised in relation to the bottom field and kept together by double folded corner parts, the material of the package consisting of a stiff backing sheet, for instance of cardboard, enclosed between two outer flexible foils of plastics and/or aluminum, etc.

According to the invention the package is characterized by the fact that the backing sheet presents parts within the corner parts, from which all material has been removed, by means of which the finished package will have double folded flexible sealing flaps, totally or partly lacking inner stiffening backing sheet material. By this several real advantages are gained. Among other things a package of rather uniform thickness can be produced without the double folded parts of the corresponding conventional cardboard packages, which often give you trouble since, owing to their thickness, they can not be made quite tight-fitting. This is particularly important if you want to produce a wholly sterile preserving-package, which of course must be absolutely airtight.

Furthermore, a number of advantages are gained that will be more thoroughly described in the following detailed description of a few preferable embodiments. These are described with reference to the attached drawings, which also show a plant for producing packaging elements to be used in packages according to the invention.

DESCRIPTION OF DRAWINGS

FIG. 4 shows how the backing sheet of FIG. 1 is enclosed between two flexible foils of plastic material and/or aluminum, etc.

FIGS. 5 and 6 show sections along line V—V in FIG. 4, representing two alternative embodiments of the object of the invention.

FIG. 7 shows the package material according to FIG. 4 in a raised position.

FIG. 8 shows a section along line VIII—VIII in FIG. 7 on a larger scale.

FIGS. 9 and 10 show the same section according to two alternative embodiments.

FIG. 11 shows a section through a finished raised and sealed package.

FIG. 12 finally shows a plant for producing packaging materials according to the invention.

DETAILED DESCRIPTION

Figure 1:
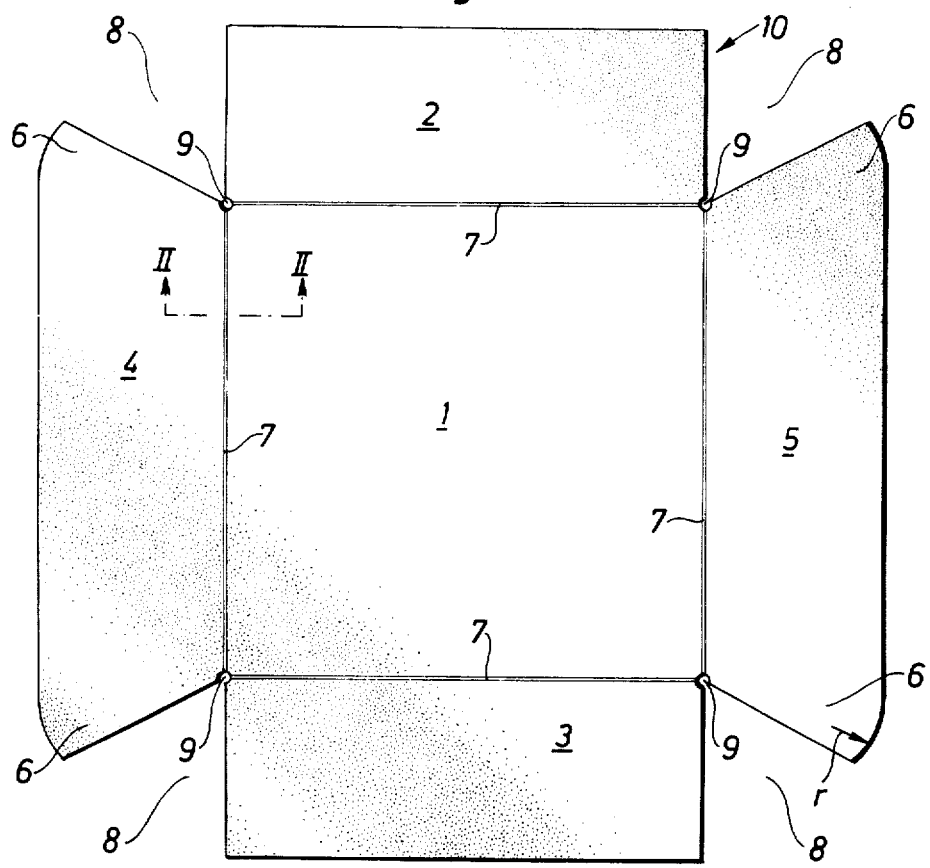
FIG. 1 accordingly shows a plain backing sheet, intended to be an enclosed part of the package according to the invention.
Figure 2:
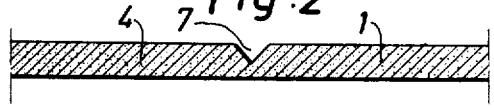
FIGS. 2 and 3 show sections along line II—II in FIG. 1 and should illustrate these sections in horizontal and raised positions, respectively.
Figure 3:
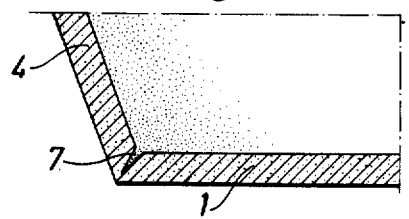

The backing sheet shown in FIG. 1 preferably consists of cardboard but can of course also be made of other corresponding stiff materials. The carboard element shown by way of example involves a bottom field 1, four side field 2, 3, 4 and 5, and four mainly triangular extension parts 6, which are connected with the side fields 4 and 5. As will best be seen by a comparison between FIGS. 1, 2 and 3, the bottom field 1 is separated from the side fields 2-5 by scratched folding lines 7. These V-formed folding lines 7 are cut down to about two thirds of the thickness of the cardboard material and have a form that will cause the least possible strain in the raising process to the outer foils with which the material is later to be laminated, as will be shown in detail in the following. Between the side fields 2 and 3 and the adjacent triangular extension parts 6 parts of the material 8 have been cut off by stamping, their innermost parts ending in a rather small circular hole 9. The hole 9 is also made by stamping and will be further explained later. In practice it has a diameter of 2-4 mm.

If in FIG. 1 the border lines between the parts 8 and the side fields 2 and 3 are compared with the scratched folding lines 7, it will be found that the former are laterally dislocated 0.5-1 mm in relation to the latter. The same is applicable to the extension parts 6, i.e. the parts 8 are somewhat enlarged in relation to the theoretically true size of a certain cardboard element. This enlargement is to compensate later for the applied outer material as will be seen in the following.

FIGS. 4-6 describe how the cardboard material according to FIG. 1 can be enclosed between outer foils of plastic and/or aluminum. Both in FIG. 5 and FIG. 6 the upper surface is meant to form the inner surface of the ready package. According to the embodiment shown in FIG. 5 the cardboard element, which as a whole has obtained the reference numeral 10, is thus intended to be enclosed between an inner plastic foil 11 and an outer one 12, an aluminum foil 13 being placed inbetween the plastics foil 12 and the cardboard element 10. With reference numerals 14 and 15, respectively, two binder layers are marked, which can be of an arbitrary kind but preferably consist of a two-component lacquer of the sort that is normally used in the lacquer-laminating of foils.

The embodiment according to FIG. 6 corresponds to that of FIG. 5 apart from the fact that the aluminum foil has been placed on the inside of the cardboard element. Hence, the same reference numerals have been used with the addition of the accent denoting prime. If you look more closely at the binder layers 14, 15 and 14', 15', respectively, you will find that the cardboard element 10 in FIG. 5 is attached to the aluminum foil 13 but lies loosely against the plastics film 11. In FIG. 6, on the other hand, the cardboard element 10' is free in relation to the plastic film 12'. These two constructions have the advantage in common that you avoid building up rather great strains in the finished package during the raising process. The same effect is aimed at in modelling the scratching-lines 7 shown in FIGS. 1-3. A similar effect is also caused by the circular holes 9 at the inner points of the removed parts 8. Moreover, you gain by these stamped holes 9 that the outer foil(s) (12, 13 and 12', respectively) can more or less give way to any blows against the corners. Consequently, the corners will be somewhat "softer" while at the same time the package will be extremely tight.

The embodiment according to FIG. 6 is primarily chosen if you wish to furnish the package with an outer decor. In this case the decor can be applied to the outside of the cardboard material 10' and be protected by a transparent plastics film 12'. After laminating the cardboard materials 10, 10' between the outer plastics foils you stamp package material of the kind that is shown in FIG. 4 and which as a whole has been provided with the reference numeral 16. In FIG. 4 an essentially square packaging element is shown for this purpose, but to one skilled in the art it will be obvious that the form can be made rectangular, pentagonal, hexagonal, etc. In the embodiment according to FIG. 4 the material diverges from the square form by the radius R, corresponding to the radius r of the extension parts 6, and by the fact that this radius R afterwards turns into an oblique line 17.

In FIG. 7 an example is given of a raised package which in its entirety has been provided with reference numeral 18. This package has a bottom 1a, four sides 2a–5a, rounded corner fields 6a, and sealing flaps 8a. The reference numerals have accordingly been chosen so as to agree with those of the cardboard element according to FIG. 1, with the addition of the letter a.

FIG. 8 shows a section along line VIII—VIII in FIG. 7. This section corresponds to the embodiment according to FIG. 6, i.e. the aluminum foil 13' is placed on the inside of the cardboard element 10'. For the sake of clearness the plastic and the aluminum layers have been drawn exaggeratedly thick in comparison with the cardboard sheets. In practice they are considerably thinner, which is of great advantage above all if you aim at a well sealed package. Both the sealing flaps 8a and the collar 19 round the opening will consequently in practice be much thinner and more flexible than the rest of the package material.

The embodiment according to FIG. 9 coincides principally with the one according to FIG. 8, apart from the fact that the sealing flap has been placed on the outside of the package and accordingly has been given the reference numeral 8a'.

It is to be noted from looking at FIGS. 8 and 9 that there is no overlap whatsoever of the cardboard sheet. Rather, the adjacent side edges of the sheet along cutout portions 8 are in abutting relationship. Thus, the only extra thickness at the corners is due to the relatively thin outer flexible foils. In this manner, improved sealing at the corners is obtained.

In the embodiment according to FIG. 10 only half as much cardboard material has been removed from the parts 8 (cf. FIG. 1), so cardboard material 20 is still included in the sealing flap 8a''. In spite of this the corner sealing is only about two thirds as thick as the corresponding corner sealing of conventional carboard boxes, which normally contain three layers of cardboard material. It is to be preferred that the material 20 extends upwards only as far as the material of the triangular extension parts 6, which will consequently in turn be extended by these parts of material 20. Hereby the collar 19 (FIG. 7) can still be formed in such a manner that it does not contain any cardboard material.

In FIG. 11 a package according to the invention is shown closed and in a raised position. The embodiment corresponds in this case to that according to FIG. 5, which means that the aluminum layer 13 is outside the cardboard element 10. The collar 19 of the package now consists only of the two plastics sheets 11 and 12 and of the aluminum layer 13. The package is here shown after being closed by a thermo-formed plastic cover 21, which on its inside has been furnished with an aluminum foil 22. This foil 22 extends between the cover 21 and the collar 19, but does not reach the outer edge of any of them. In this way a thermo-sealing procedure can be brought about in the layer 23 between the cover 21 and the foil 11. This sealing is done properly in an inductive way by heating the aluminum foil 13. If the aluminum foil 22 is allowed to extend a little further out between the parts 21 and 19, you can, if you find this appropriate, also heat the outer edge of this foil so as to improve the sealing effect still more. If the product to be packed requires this, the inside of the aluminum foil 22 can be furnished with a protective lacquering or rather thin plastics sheet in order to prevent the product from being unfavourably affected.

FIG. 12 finally shows a plant for making packing elements of the kinds that are displayed in FIG. 4 and either of FIGS. 5 and 6. If you chose an embodiment according to FIGS. 4 and 5, the roller stand 24 should be one for the outer material. In this case the material will consist of a laminate including the plastics foil 12 and the aluminum foil 13 combined by the binder layer 14. This laminate is conducted through a pasting mechanism 25 via a guiding roller 26 through a heating oven 27. Here the binder is dried into a half-dry state. Via another guiding cylinder 28 the material is then brought down to the nip of a primary couple of cylinders 29. Here it is combined with the inner material 11, which is rolled off a roller stand 30. This inner material 11 is conducted over a guiding roller 31 and is thus combined with the outer material in the nip of the two cylinders 29. Cardboard material 10 is fed into this very nip in such a way that it is quite enclosed between the inner web 11 and the outer web 12, 13 and 14, respectively. The laminate produced can then be fed through another couple of cylinders 32 and further along to a punch 33, in which packaging elements 16 are stamped. In order to make this process intermittent the web between the cylinders 32 and the punch 33 is suitably slackened. If the packaging elements 16 are stamped at certain intervals, the remaining waste material can be rolled up via guiding rollers 34 and 35 onto a roller stand 36. As an alternative you can separate the different materials by simple slits and quite cut off the unnecessary corner parts (outside the oblique line 17 and the radius R, respectively, of the material according to FIG. 4). In this case the roller stand 36 can be substituted by a simple suction device for the cut-off parts.

As a matter of course the invention is not limited only to the embodiments described above, but may be varied within the scope of the following claims. For example, the form of the packaging material, as has already been said, can be varied within wide limits. The material of the different layers, of course, can also be varied according to need. If for instance you want a package that is to be sterilized in an autoclave, you may for the plastics foils 11 and 12 chose for example polypropylene. If you are less exacting as for the material you may instead chose polyethylene. The cover must not necessarily be thermo-formed. Alternatively the package can be shut by means of a simple wafer. Still more modifications of the package may be made according to the invention without going beyond its limits.

Naturally the plant shown in FIG. 12 can also be modified. Thus, the two cylinders 32 can be left out or be replaced by a stamping or pressing device in combination with the punch 33. It is further to be observed that practical experiments have proved that for the cylinder 29 you should chose 50 percent higher pressure than in the normal lacquer laminating of only foils. At the same time you preferably chose a somewhat softer coating than is normally used for these cylinders. Thus, a good adherence has been obtained by a coating material of silicone rubber with a hardness of about 55–60 Shore, as compared to the hardness of about 80–90 Shore in the normal laminating of foil webs.

We claim:

1. A blank for making a container comprising a first member of a first thickness including a bottom field and a plurality of side fields, said side fields including side edges defining cut-out portions between adjacent side edges, and second member means of a second thickness less than said first thickness arranged in overlying relation to said first member and extending beyond said side edges of said side fields so as to completely fill said cut-out portions, said second member means comprising two sheets of flexible material adhered to and completely enclosing said first member, said two sheets of flexible material extending beyond said side fields and said cut-out portions to define collar means, said container when erected from said blank having the adjacent side edges of each cut-out portion in abutting relationship with each other so that there is no overlap of said first member upon itself.

2. The blank of claim 1 wherein said first member comprises a sheet of cardboard.

3. The blank of claim 1 wherein said second member means comprises a heat sealable plastic.

4. The blank of claim 1 wherein said second member means further includes a sheet of aluminum disposed between one of said flexible sheets and said first member.

5. The blank of claim 1 wherein said sheets of flexible material are adhered to said aluminum sheet by an adhesive.

6. The blank of claim 1 wherein said bottom field and said side edges of adjacent side fields define circular holes at the intersection of said adjacent side edges and said bottom field.

7. The blank of claim 1 wherein said side fields are separated from said bottom field by scratch-line means extending the length of said side fields, and said first member has a thickness along said scratch-line means less than said first thickness.

8. The blank of claim 1 wherein said bottom field and said side fields are rectangular, and wherein two of said side fields disposed oppositely to each other include extension means defined by each of the short sides of the rectangles and the side edges of said two of said side fields.

9. The blank of claim 8 wherein said extension means are pie shaped.

10. A container comprising a first member of a first thickness including a bottom wall and side walls defining a cavity, said side walls including top edges and upwardly extending side edges defining cut-out portions between adjacent ones thereof, and second member means including two sheets of flexible material each of a second thickness less than said first thickness, said two sheets being arranged in overlying relation and adhered to said first member on opposite sides thereof so as to completely enclose said first member, said second member means including first extended portions extending beyond said side edges of said side walls, each said first extended portion being folded upon itself to define sealing flap means operative to seal adjacent side walls together along said side edges of said side walls, said adjacent side edges being in abutting relationship to each other so that there is no overlap of said first member upon itself, said second member means further including second extended portions extending beyond said side walls and said cut-out portions to define collar means.

11. The container of claim 10 wherein said sealing flap means are disposed within said cavity.

12. The container of claim 10 wherein said sealing flap means are disposed outside of said cavity.

13. The container of claim 10 wherein said first member comprises a sheet of cardboard.

14. The container of claim 10 wherein said second member comprises a heat sealable plastic.

15. The container of claim 10 wherein said second member means further includes a sheet of aluminum disposed between one of said flexible sheets and said first member.

16. The container of claim 15 wherein said sheets of flexible material are adhered to said aluminum sheet by an adhesive.

17. The container of claim 10 wherein said bottom wall and said side edges of adjacent side walls define circular holes at the intersection of said adjacent side edges and said bottom wall.

18. The container of claim 10 wherein said side walls are separated from said bottom wall by scratch-line means extending the length of said side walls and said first member has a thickness along said scratch-line means less than said first thickness.

19. The container of claim 10 wherein said bottom wall and said side walls are rectangular, and wherein two of said side walls disposed oppositely to each other include extension means defined by each of the short sides of the rectangles and the side edges of said two of said side walls, said extension means being disposed within said folded extended portions of said second member means.

20. The container of claim 19 further comprising a cover member of thermoplastic material in sealing relationship to said container, said cover member comprising an outer edge flange integral with an inner countersunk portion disposed in a different plane than said outer edge flange and connected thereto by a substantially vertical portion, the edges of said cover member being sealed to said collar member of said container.

21. The container of claim 20 wherein said cover member further includes a layer of aluminum foil on the inside thereof, the outer edge flange of said cover member extending beyond said layer of foil.

* * * * *